United States Patent
Horiuchi et al.

(10) Patent No.: US 8,854,574 B2
(45) Date of Patent: Oct. 7, 2014

(54) FILM-SHAPED LIGHTGUIDE PLATE UNIT, PLANAR LIGHT UNIT, DISPLAY APPARATUS AND ELECTRONIC DEVICE

(75) Inventors: Yoshitake Horiuchi, Fujiyoshida (JP); Tatsuro Yamada, Fujiyoshida (JP)

(73) Assignee: Citizens Electronics Co., Ltd., Yamanashi-ken (JP)

( * ) Notice: Subject to any disclaimer, the term of this patent is extended or adjusted under 35 U.S.C. 154(b) by 288 days.

(21) Appl. No.: 12/196,649

(22) Filed: Aug. 22, 2008

(65) Prior Publication Data
US 2009/0051851 A1 Feb. 26, 2009

(30) Foreign Application Priority Data

Aug. 23, 2007 (JP) ................... 2007-217675

(51) Int. Cl.
G02F 1/1335 (2006.01)
F21V 11/00 (2006.01)
F21V 8/00 (2006.01)

(52) U.S. Cl.
CPC ........ *G02B 6/0088* (2013.01); *G02F 1/133604* (2013.01); *G02F 1/133611* (2013.01); *G02F 1/133606* (2013.01); *G02B 6/0021* (2013.01); *G02B 6/0068* (2013.01); *G02F 1/133615* (2013.01)
USPC .......................................... 349/64; 362/355

(58) Field of Classification Search
CPC ................... G02F 1/133604; G02F 1/133606; G02F 1/133607; G02F 1/133611
USPC ....................... 349/64; 362/311, 355
See application file for complete search history.

(56) References Cited

U.S. PATENT DOCUMENTS

| 4,743,983 | A | * | 5/1988 | Hadamek ...................... 360/55 |
| 5,940,215 | A | * | 8/1999 | Rudisill et al. ................ 359/599 |
| 5,975,711 | A | * | 11/1999 | Parker et al. .................... 362/24 |
| 6,247,826 | B1 | | 6/2001 | Funamoto et al. |
| 6,648,902 | B2 | * | 11/2003 | Colgan et al. ................ 606/205 |
| 7,188,989 | B2 | | 3/2007 | Miyashita |
| 2003/0063456 | A1 | * | 4/2003 | Katahira ........................ 362/27 |
| 2005/0128379 | A1 | * | 6/2005 | Matsunaga et al. ............. 349/64 |

FOREIGN PATENT DOCUMENTS

| CN | 1403852 A | 3/2003 |
| CN | 1403852 A | 3/2003 |
| JP | H02-079558 | 3/1992 |
| JP | 2004-095516 | 3/2004 |
| JP | 2005-292729 | 10/2005 |
| JP | 2006-318830 A | 11/2006 |
| JP | 2006-338019 | 12/2006 |
| JP | 2007-217675 | 8/2007 |

OTHER PUBLICATIONS

Notification of First Office Action from the Chinese Patent Office, dated Jul. 13, 2011, with translation (9 pages).

(Continued)

*Primary Examiner* — Jerry Blevins
(74) *Attorney, Agent, or Firm* — Brinks Gilson & Lione

(57) ABSTRACT

A film-shaped lightguide plate unit enables reductions in thickness and weight. The film-shaped lightguide plate unit (7) has a film-shaped lightguide plate (6) and a support frame (8) made of a film material to support at least the outer peripheral edge of the film-shaped lightguide plate (6). Optical sheets including the film-shaped lightguide plate, a diffusing sheet, a prism sheet, etc. are disposed inside the support frame.

2 Claims, 2 Drawing Sheets

(56) References Cited

OTHER PUBLICATIONS

Notification of Office Action from the Chinese Patent Office, dated Jan. 10, 2012, with translation (4 pages).

Notification of Office Action from the Chinese Patent Office, dated Apr. 12, 2012, with translation (12 pages).

Notification of the Second Office Action dated Nov. 15, 2012 for Chinese Application No. 200810210014.0 (with English translation) (10 pp.).

\* cited by examiner

FILM-SHAPED LIGHTGUIDE PLATE UNIT, PLANAR LIGHT UNIT, DISPLAY APPARATUS AND ELECTRONIC DEVICE

RELATED APPLICATIONS

This application claims priority under 35 U.S.C. §119 to Japanese Patent application No. JP2007-217675 filed on Aug. 23, 2007, the entire content of which is hereby incorporated by reference.

TECHNICAL FIELD

The present invention relates to a film-shaped lightguide plate unit used in a planar light source that illuminates a liquid crystal display panel or the like. The present invention also relates to a planar light unit, a display apparatus and an electronic device that have the film-shaped lightguide plate unit.

RELATED CONVENTIONAL ART

Liquid crystal display apparatus for image display are widely used in displays of mobile phones, personal digital assistants (PDAs), mobile personal computers (PCs), automatic teller machines (ATMs), etc. These liquid crystal display apparatus employ a backlight unit that applies illuminating light to a light-transmitting liquid crystal display panel from the back thereof to enhance the luminance of the display screen on the front thereof.

The backlight unit uses a lightguide plate that guides light from a light source, e.g. a fluorescence lamp or light-emitting diode (LED) light source, and that emits the light toward a liquid crystal display panel from the entire area of a light exiting surface thereof. Conventionally, the lightguide plate is supported with a support frame made of a resin material, and the support frame is provided around the lightguide plate, as disclosed, for example, in Japanese Patent Application Publication No. 2006-318830. The support frame for the lightguide plate is, generally, produced by injection molding process.

It has recently been demanded that backlight units should be thinner in order to reduce weight and thickness of end products using them, and lightguide plates have also been reduced in thickness. When a film-shaped lightguide plate is employed as a thin lightguide plate, a support frame for supporting it is also required to be reduced in thickness. To form such a thin support frame by injection molding process, it is necessary to use a large-sized injection molding machine with high injection pressure in order to fill the resin material throughout the mold for producing the support frame. The use of such a large-sized injection molding machine increases installation cost, resulting in an increase in product cost.

SUMMARY OF THE INVENTION

The present invention has been made in view of the above-described problems with the conventional art. Accordingly, an object of the present invention is to provide a lightguide plate unit that can be readily reduced in thickness and weight. Another object of the present invention is to provide a planar light unit having the lightguide plate unit of the present invention. Still another object of the present invention is to provide a display apparatus having the planar light unit of the present invention. A further object of the present invention is to provide an electronic device having the display apparatus of the present invention.

The present invention provides a film-shaped lightguide plate unit including a film-shaped lightguide plate and a support frame made of a film material. The support frame is configured to extend along the outer peripheral edge of the film-shaped lightguide plate to support at least a part of the outer peripheral edge.

In the present invention, the film-shaped lightguide plate unit comprises a film-shaped lightguide plate and a support frame made of a film material. Therefore, the overall thickness of the lightguide plate unit can be reduced to a considerable extent. Because the support frame is made of a film material, the support frame itself is pliable. Thus, it is possible to bend and fold the whole film-shaped lightguide plate unit.

Specifically, the film-shaped lightguide plate unit may be arranged as follows. The film-shaped lightguide plate is disposed inside the support frame. The film-shaped lightguide plate unit further includes an adhesive sheet bonded to the support frame. The adhesive sheet extends inward of the support frame and is bonded to the film-shaped lightguide plate. Thus, the film-shaped lightguide plate is supported by the support frame through the adhesive sheet. With this arrangement, the film-shaped lightguide plate unit can be further reduced in thickness.

More specifically, the support frame may be punched from a polyethylene terephthalate film or a stainless steel film. Thus, the support frame can be readily produced, and the cost of the constituent member can also be reduced.

The film-shaped lightguide plate unit may further include at least one optical sheet that is stacked on the film-shaped lightguide plate inside the support frame. In this case, the optical sheet may also be supported by a single support frame together with the film-shaped lightguide plate.

The film-shaped lightguide plate unit may be arranged as follows. The optical sheet has a projection or a recess on the outer peripheral edge thereof, and the support frame has a recess or a projection on the inner peripheral surface thereof. The recess or projection of the support frame is fittable with the projection or recess of the optical sheet disposed inside the support frame. This arrangement facilitates the installation of the optical sheet.

The thickness of the support frame may be set substantially equal to the total thickness of the film-shaped lightguide plate and the optical sheet disposed inside the support frame. Consequently, the upper side of the optical sheet is flush with the upper side of the support frame, and a thin unit can be constructed.

Specifically, the optical sheet may be at least either one of a diffusing sheet and a prism sheet that is stacked over the light exiting surface of the film-shaped lightguide plate.

In addition, the present invention provides a planar light unit including the above-described film-shaped lightguide plate unit and at least one light-emitting diode light source having at least one light-emitting diode element that emits light entering the film-shaped lightguide plate. Because the above-described film-shaped lightguide plate unit is used, the planar light unit can be reduced in thickness as a whole.

Specifically, the film-shaped lightguide plate may have at least one light source accommodating hole to accommodate the at least one light-emitting diode light source. This arrangement facilitates the installation of the light-emitting diode light source.

More specifically, a plurality of mutually spaced light source accommodating holes may be disposed near one end edge of the film-shaped lightguide plate in parallel with the one end edge.

In addition, the present invention provides a display apparatus including an image display panel and the above-described planar light unit disposed at a front or back of the image display panel.

Because the display apparatus has the above-described planar light unit, the overall thickness and weight can be reduced at reduced cost.

Specifically, the image display panel may be a light-transmitting liquid crystal display panel and disposed directly above the optical sheet.

In addition, the present invention provides an electronic device including the above-described display apparatus, a sheet-shaped key part disposed at an upper side of the film-shaped lightguide plate, and a sheet-shaped switching mechanism disposed at a lower side of the film-shaped lightguide plate. The sheet-shaped key part and the sheet-shaped switching mechanism are disposed to face each other across the film-shaped lightguide plate. The key part has a plurality of light-transmitting operation keys, and the switching mechanism has a plurality of switches disposed to correspond to the operation keys, respectively.

In this electronic device, because the film-shaped lightguide plate extends as far as underneath the operation keys, not only the image display panel but also the operation keys can be illuminated with a single film-shaped lightguide plate unit. Accordingly, it is possible to reduce the number of constituent members of the backlight unit for the operation keys and to reduce the number of assembling steps and hence possible to further reduce the overall cost.

Embodiments of the present invention will be explained below with reference to the accompanying drawings. It should be noted that the scale of the figures used in the following explanation is properly changed to show each member in a recognizable size.

DETAILED DESCRIPTION OF THE PREFERRED EMBODIMENTS

Figure 1:
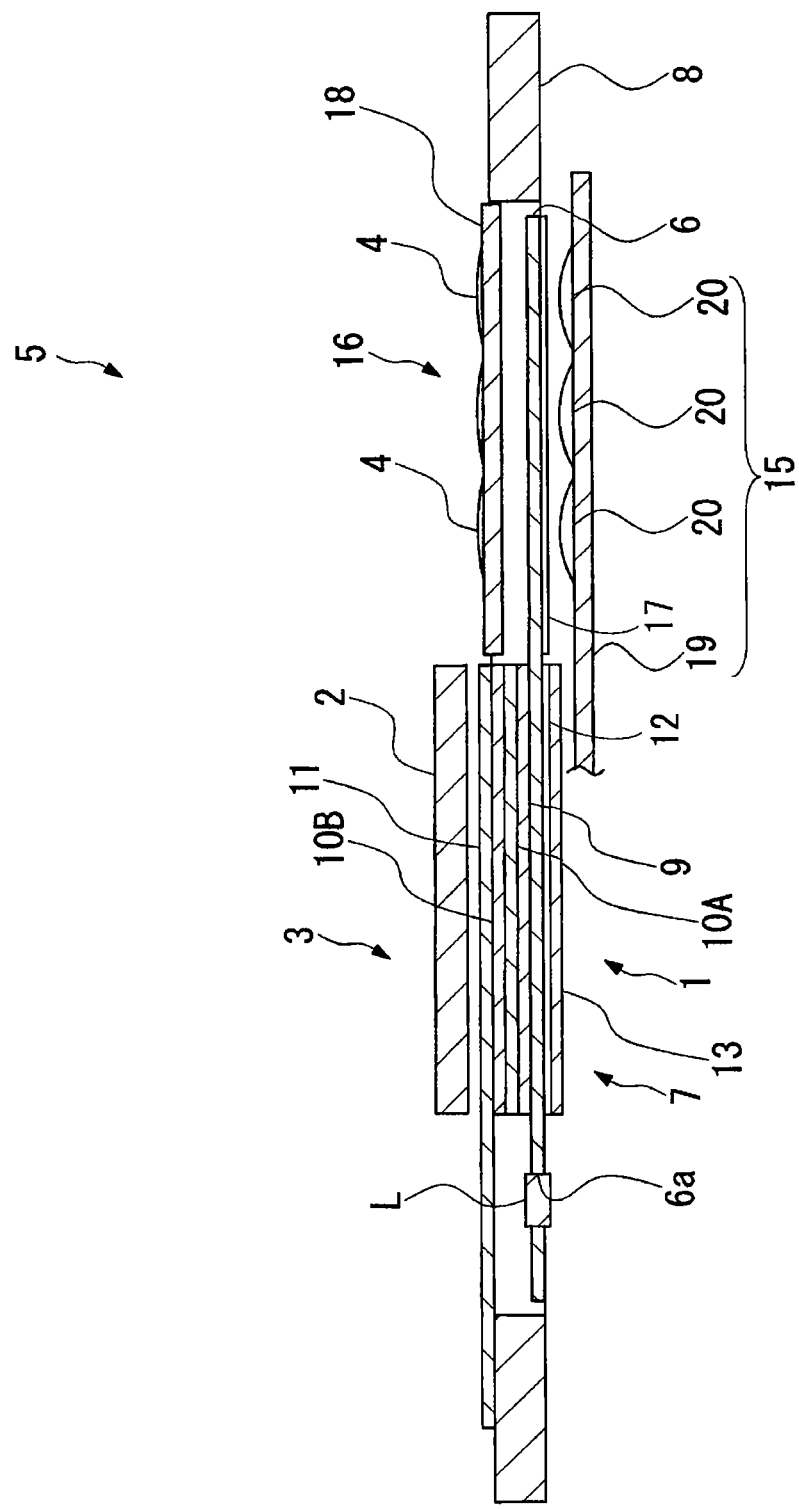
FIG. 1 is a sectional view schematically showing a main part of a mobile phone as an electronic device having a film-shaped lightguide plate unit according to the present invention.

As shown in FIG. 1, a mobile phone 5 according to an embodiment of the present invention includes a display apparatus 3 having a liquid crystal display panel 2. The mobile phone 5 further includes a backlight unit 1 that illuminates the liquid crystal display panel 2 from a back thereof and a keypad 18 having operation keys 4.

Figure 2:
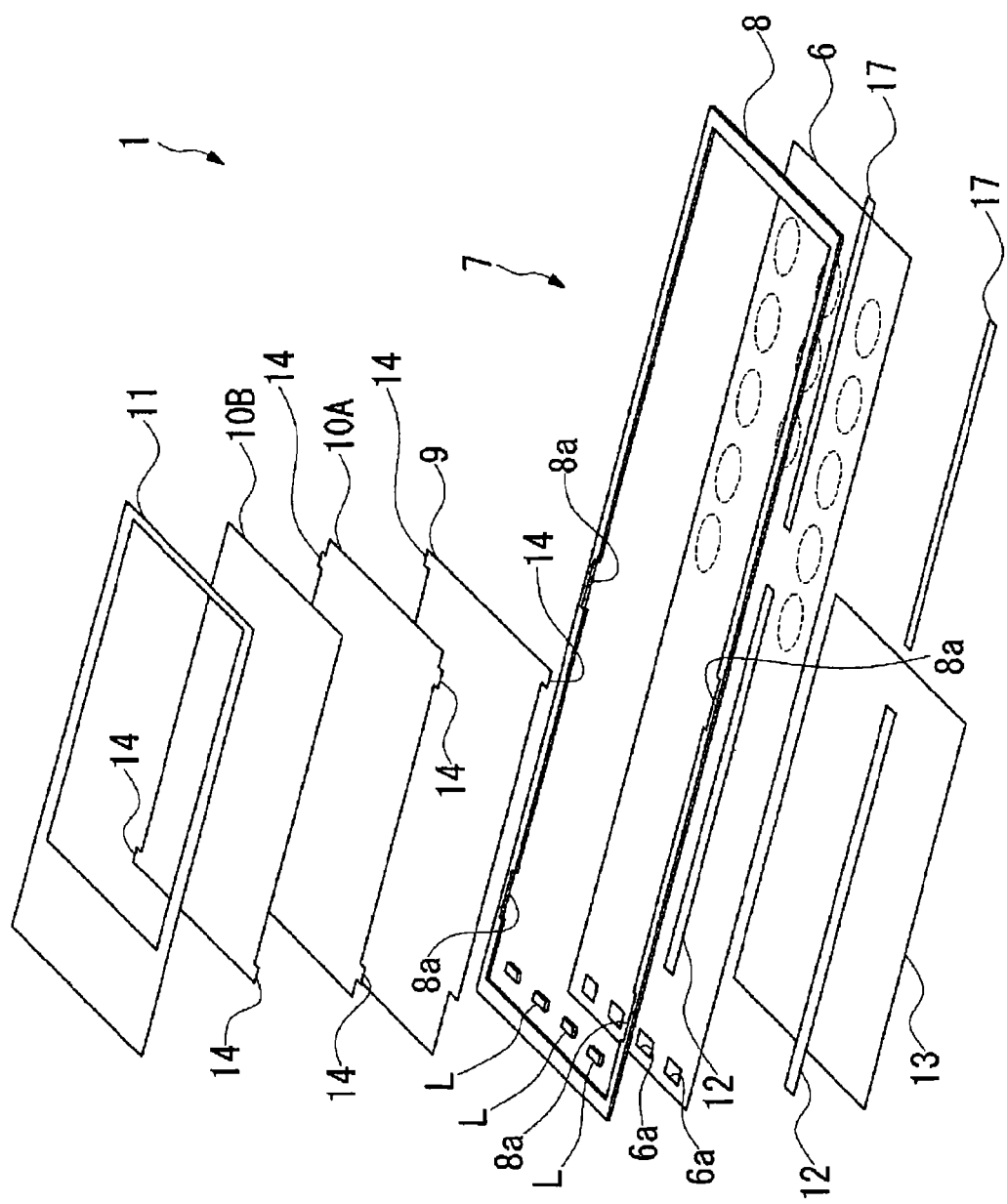
FIG. 2 is an exploded perspective view of a backlight unit used in the mobile phone shown in FIG. 1.

The backlight unit 1 includes LED light sources L having light-emitting diode elements (not shown) and a film-shaped lightguide plate unit 7 having a film-shaped lightguide plate 6 that guides light from the light sources L and that emits the light toward the liquid crystal display panel 2. As shown in FIG. 2, the film-shaped lightguide plate unit 7 includes a rectangular support frame 8, a reflecting sheet 13 bonded to a lower side of the support frame 8 with at least two strips of double-sided adhesive tape 12 bonded to two sides of the support frame 8, a stack of a film-shaped lightguide plate 6, a diffusing sheet 9 and first and second prism sheets 10A and 10B disposed inside the support frame 8 and successively stacked on the reflecting sheet 13, and a rim sheet 11 comprising a substantially frame-shaped piece of double-sided adhesive tape bonded to the upper side of the support frame 8. The liquid crystal display panel 2 is disposed above the rim sheet 11.

The two strips of double-sided adhesive tape 12 are bonded to the respective lower sides of two longitudinally extending side portions of the support frame 8 and having a portion exposed inside the support frame 8. The reflecting sheet 13 is bonded to the lower sides of the two strips of double-sided adhesive tape 12, and the longitudinally extending side edge portions of the lower side of the film-shaped lightguide plate 6 are bonded to the upper sides of the two strips of double-sided adhesive tape 12. The support frame 8 has other two strips of double-sided adhesive tape 17 bonded to the lower side thereof. The two strips of double-sided adhesive tape 17 also having a portion exposed inside the support frame 8. The longitudinally extending side edge portions of the lower side of the film-shaped lightguide plate 6 are bonded to the upper sides of the two strips of double-sided adhesive tape 17. Each strip of double-sided adhesive tape 17 has a release sheet (not shown) applied to the lower side thereof. When the film-shaped lightguide plate unit 7 is to be mounted in an electronic device such as a mobile phone, the release sheet is removed, and each strip of double-sided adhesive tape 17 is bonded, for example, to the inner surface of the casing of the electronic device.

The diffusing sheet 9 and the first and second prism sheets 10A and 10B each have projections 14 formed on the longitudinally extending side edges thereof. The projections 14 are fitted into recesses 8a formed on the support frame 8. The stack of diffusing sheet 9 and first and second prism sheets 10A and 10B is fitted at the projections 14 into the recesses 8a and bonded at the peripheral edge portions of the upper and lower sides thereof with strips of double-sided adhesive tape (12 and 17) bonded to the support frame 8.

The support frame 8 is pliable and punched with a press from a large-sized polyethylene terephthalate (PET) or stainless steel (SUS) film, for example. The thickness of the support frame 8 is set substantially equal to a total thickness of the film-shaped lightguide plate 6, the diffusing sheet 9 and the first and second prism sheets 10A and 10B, which are fitted in the support frame 8.

The film-shaped lightguide plate 6 is made of a pliable light-transmitting material. The film-shaped lightguide plate 6 guides light from the LED light sources L throughout it and emits the light from a light exiting surface (upper surface in the figures) thereof. The thickness of the film-shaped lightguide plate 6 is, for example, about 125 μm. In the illustrated film-shaped lightguide plate unit 7, the film-shaped lightguide plate 6 supported by the support frame 8 extends as far as underneath the operation keys 4 to illuminate not only the liquid crystal display panel 2 but also the operation keys 4.

The film-shaped lightguide plate 6 comprises, for example, a substrate layer (not shown) and resin layers (not shown) formed on the upper and lower sides of the substrate layer. Each resin layer has a plurality of microscopic optical configurations (e.g. convex dots) formed on a surface thereof to perform optical path conversion.

The substrate layer and the resin layers are formed of a transparent polycarbonate or acrylic resin, for example. The substrate layer is sheet-formed into a flat sheet shape by using roll forming process, for example. The resin layers are formed as follows. A coating of photo-setting organic resin that sets upon irradiation with ultraviolet (UV) radiation, e.g. one selected from among acrylic, urethane, urethane acrylate and epoxy acrylate resins, is applied to the upper and lower sides of the substrate layer, and microscopic optical configurations are formed on the surface of the resin coating by using a die. Thereafter, the resin coating is set by irradiation with ultraviolet radiation.

In the actual practice, a large-sized sheet formed as stated above is cut with a press or a cutter to obtain a film-shaped lightguide plate 6 of a predetermined shape and size.

In the illustrated example, one end portion of the film-shaped lightguide plate 6 is provided with a plurality of light source accommodating holes 6a for accommodating the LED light sources L. However, the location where the light source accommodating holes 6a are provided is not necessarily limited to the end portion of the film-shaped lightguide plate 6. For example, the light source accommodating holes 6a may be provided in the center of the film-shaped lightguide plate 6. It is also possible to provide LED light sources L not only at the above-described one end portion of the film-shaped lightguide plate 6 but also at the other opposite end portion thereof.

The diffusing sheet 9 is formed by dispersing silica particles or the like into a transparent resin, e.g. an acrylic resin, or a polycarbonate resin.

The first prism sheet 10A and the second prism sheet 10B are transparent sheet-shaped members that collect light from the diffusing sheet 9 and direct it upward. The first and second prism sheets 10A and 10B have on their upper sides a plurality of mutually parallel elongated prisms. The respective prisms of the first and second prism sheets 10A and 10B are disposed to intersect each other as viewed from above the prism sheets 10A and 10B, i.e. in plan view. To increase the upward directivity of light transmitted through the first and second prism sheets 10A and 10B, the prisms of the first prism sheet 10A are set in a direction perpendicular to the optical axis of light emitted from the LED light sources L and traveling through the film-shaped lightguide plate 6 from one end toward the other end thereof, and the prisms of the second prism sheet 10B are set parallel to the optical axis of light from the LED light sources L.

The reflecting sheet 13 is a metal plate, sheet or foil having a light-reflecting function. In this embodiment, a sheet provided with an evaporated silver layer is employed as the reflecting sheet 13. It should be noted that an evaporated aluminum layer or the like may be used in place of the evaporated silver layer.

The rim sheet 11 is double-sided adhesive tape used to bond together the liquid crystal display panel 2 or a casing of an electronic device, for example, and the backlight unit 1, as has been stated above. The rim sheet 11 has the light-shielding and -reflecting functions.

The LED light sources L are white LEDs mounted on a substrate (not shown) for light source. Each white LED is, for example, a semiconductor light-emitting element mounted on a substrate and sealed with a resin material. The semiconductor light-demitting element is, for example, a blue (wavelength $\lambda$: 470 to 490 nm) LED element or an ultraviolet (wavelength $\lambda$: less than 470 nm) LED element, which is formed by stacking a plurality of semiconductor layers of a gallium nitride compound semiconductor (e.g. InGaN compound semiconductor) on an insulating substrate, e.g. a sapphire substrate.

The resin material used to seal the semiconductor light-emitting element is formed by adding, for example, a YAG fluorescent substance into a silicone resin as a main component. The YAG fluorescent substance converts blue or ultraviolet light from the semiconductor light-emitting element into yellow light, and white light is produced by color mixing effect. It should be noted that various LED elements in addition to those described above can be used as the white LEDs. Places where the LED light sources L are mounted are not necessarily limited to the spaces in the light source accommodating holes 6a. The LED light sources L may be mounted at respective positions near an end surface of the film-shaped lightguide plate 6.

The backlight unit 1 is assembled as follows. First, the support frame 8 is fixed on a jig (not shown) serving as a base, and strips of double-sided adhesive tape 12 and 17 are stuck to the upper side of the support frame 8. The release sheets applied to the exposed sides of the strips of double-sided adhesive tape 12 are removed, and the reflecting sheet 13 is stuck to the exposed strips of double-sided adhesive tape 12. It should be noted that the release sheets applied to the strips of double-sided adhesive tape 17 are not removed. Thereafter, the support frame 8 is removed from the jig and turned upside down. The film-shaped lightguide plate 6 is placed on the reflecting sheet 13, and the longitudinally extending side edges of the film-shaped lightguide plate 6 are bonded to the portions of the strips of double-sided adhesive tape 12, the portions that are exposed inside the support frame 8. Next, a flexible printed substrate (not shown) having the LED light sources L which are mounted thereon is disposed to locate each LED light source L in the corresponding light source accommodating hole 6a of the film-shaped lightguide plate 6.

A sheet unit is assembled in advance which has the second prism sheet 10B, the first prism sheet 10A and the diffusing sheet 9 stuck to the lower side of the rim sheet 11 in the order mentioned. Specifically, after the second prism sheet 10B has been bonded at both longitudinal ends thereof to the rim sheet 11, the first prism sheet 10A and the diffusing sheet 9 are successively laid under the second prism sheet 10B and bonded together by using pieces of double-sided adhesive tape provided between the projections 14 of these sheets. The sheet unit thus prepared is fitted into the support frame 8 from above, and thus the second prism sheet 10B, the first prism sheet 10A and the diffusing sheet 9 are mounted in the support frame 8. In addition, the rim sheet 11 is stuck to the upper side of the support frame 8. During this assembling process, the projections 14 of each sheet are fitted into the corresponding recesses 8a of the support frame 8. In this way, the backlight unit 1 is produced in which the reflecting sheet 13 and the rim sheet 11 are stuck to the lower and upper sides, respectively, of the support frame 8, and in which the film-shaped lightguide plate 6, the diffusing sheet 9 and the first and second prism sheets 10A and 10B are stacked between the reflecting sheet 13 and the rim sheet 11 inside the support frame 8.

The mobile phone 5 further includes a sheet-shaped key operation unit 16 having a keypad 18 and a switching mechanism 15 disposed underneath the keypad 18.

The liquid crystal display panel 2 is a transmissive or semitransmissive liquid crystal display panel. In the case of a semitransmissive liquid crystal display panel 2, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer. The semitransmissive liquid crystal display panel 2 further has a semitransmitting-reflecting sheet having both light-transmitting and -reflecting functions, which is provided underneath the panel body.

The operation keys 4 of the keypad 18 are light-transmitting and pliable keys that have numerals or letters displayed thereon to enter a phone number, etc.

The switching mechanism 15 comprises, for example, a switch substrate 19 and tact switches 20 mounted thereon. When one operation key 4 is depressed, the corresponding tact switch 20 is pressed through the film-shaped lightguide plate 6 to perform an ON/OFF operation.

It should be noted that the keypad 18 is stuck to the upper side of the support frame 8 with double-sided adhesive tape or the like (not shown).

Thus, in the film-shaped lightguide plate unit 7 and the backlight unit 1 in this embodiment, the outer peripheral portion of the film-shaped lightguide plate 6 is supported by the support frame 8, which is made of a film material. This enables the overall thickness to be reduced to a considerable extent. When a support frame 8 higher in rigidity than the film-shaped lightguide plate 6 is employed, in particular, it is possible to support the film-shaped lightguide plate 6 even more firmly and to allow the resulting unit to have a high rigidity as a whole. In addition, the support frame 8 can suppress leakage of light from the peripheral surfaces of the film-shaped lightguide plate 6, and thus the light utilization efficiency can be increased.

It should be noted that the support frame 8 which is pliable allows the whole unit to be bent and folded.

Further, because a plurality of optical sheets are fitted in the support frame 8, these optical sheets can be supported with a single support frame 8, together with the film-shaped lightguide plate 6. Particularly, because the inner peripheral portion of the support frame 8 is provided with the recesses 8a that are fittable with the corresponding projections 14 of each optical sheet, each optical sheet can be readily positioned with respect to the support frame 8.

Further, because the thickness of the support frame 8 is substantially equal to the total thickness of the optical sheets, the upper side of the uppermost optical sheet is flush with the upper side of the support frame 8, and a thin unit can be constructed.

Thus, the backlight unit 1, the display apparatus 3 and the mobile phone 5 use a combination of the film-shaped lightguide plate unit 7 and the LED light sources L, which are small light sources. Accordingly, it is possible to obtain a light unit reduced in thickness and weight as a whole at a reduced cost.

Further, because the film-shaped lightguide plate 6 supported by the support frame 8 extend as far as underneath the operation keys 4, not only the liquid crystal display panel 2 but also the operation keys 4 can be illuminated with a single film-shaped lightguide plate unit 7. Accordingly, it is possible to reduce the number of constituent members of the backlight for the operation keys and to reduce the number of assembling steps and hence possible to further reduce the overall cost.

It should be noted that the present invention is not necessarily limited to the foregoing embodiment but can be modified in a variety of ways without departing from the scope of the present invention.

For example, the diffusing sheet 9 used in the backlight unit of the foregoing embodiment may be omitted. Although two prism sheets are used in the foregoing embodiment, the backlight unit may have only one prism sheet.

Although in the foregoing embodiment the present invention is applied to the mobile phone 5, the present invention may be applied to other various electronic devices, e.g. personal digital assistants (PDAs), mobile personal computers (PCs), etc.

Although the foregoing embodiment employs the liquid crystal display panel 2 as an image display panel, other types of image display panels may be used, for example, an electronic paper. In this case, the planar light unit including the film-shaped lightguide plate unit according to the present invention is mounted as a front light unit at the front side of the electronic paper body.

Although in the foregoing embodiment the two strips of double-sided adhesive tape 12 are bonded to the respective sides of two longitudinally extending side portions of the support frame 8, the double-sided adhesive tape 12 may be bonded to one side of the support frame 8 to support the film-shaped lightguide plate 6 and the optical sheets.

The invention claimed is:

1. An electronic device comprising:
   a display apparatus, the display apparatus comprising:
      an image display panel; and;
      a planar light unit comprising at least one light-emitting diode light source and a film-shaped lightguide plate unit including a film-shaped lightguide plate and a support frame that is made of a film material, pliable and configured to extend along an outer peripheral edge of the film-shaped lightguide plate and supporting at least a part of the outer peripheral edge of the film-shaped lightguide plate;
      wherein the at least one light-emitting diode light source each having at least one light-emitting diode element that emits light entering the film-shaped lightguide plate and the planar light unit is disposed at a front or a back of the image display panel;
   a sheet-shaped key part provided at an upper side of the film-shaped lightguide plate; and
   a sheet-shaped switching mechanism provided at a lower side of the film-shaped lightguide plate, the sheet shaped key part and the sheet-shaped switching mechanism that are disposed to face each other across the film-shaped lightguide plate, the key part having a plurality of light-transmitting operation keys, and the switching mechanism having a plurality of switches disposed to correspond to the operation keys, respectively.

2. An electronic device comprising:
   a display apparatus, the display apparatus comprising:
      an image display panel; and
      a planar light unit comprising at least one light-emitting diode light source, and a film-shaped lightguide plate unit including a film-shaped lightguide plate and a support frame that is made of a film material, pliable and configured to extend along an outer peripheral edge of the film-shaped lightguide plate and supporting at least a part of the outer peripheral edge of the film-shaped lightguide plate;
      wherein the at least one light-emitting diode light source each having at least one light-emitting diode element that emits light entering the film-shaped lightguide plate, further wherein the planar light unit is disposed at a front or a back of the image display panel that is a light-transmitting liquid crystal display panel and disposed above the optical sheet;
   a combination of a sheet-shaped key part and a sheet-shaped switching mechanism that are disposed to face each other across the film-shaped lightguide plate;
   the key part having a plurality of light-transmitting operation keys, and the switching mechanism having a plurality of switches disposed to correspond to the operation keys, respectively.

* * * * *

UNITED STATES PATENT AND TRADEMARK OFFICE
CERTIFICATE OF CORRECTION

| | | |
|---|---|---|
| PATENT NO. | : 8,854,574 B2 | Page 1 of 1 |
| APPLICATION NO. | : 12/196649 | |
| DATED | : October 7, 2014 | |
| INVENTOR(S) | : Horiuchi et al. | |

It is certified that error appears in the above-identified patent and that said Letters Patent is hereby corrected as shown below:

On The Title Page, item (73) Assignee

"Citizens Electronics Co., Ltd." should be deleted and replaced with
--Citizen Electronics Co., Ltd.--.

Signed and Sealed this
Ninth Day of June, 2015

Michelle K. Lee
*Director of the United States Patent and Trademark Office*